US 6,657,854 B2

(12) United States Patent
Horii et al.

(10) Patent No.: US 6,657,854 B2
(45) Date of Patent: Dec. 2, 2003

(54) PORTABLE ELECTRONIC DEVICE

(75) Inventors: Yasuyuki Horii, Ome (JP); Hajime Kotegawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 137 days.

(21) Appl. No.: 09/948,628

(22) Filed: Sep. 10, 2001

(65) Prior Publication Data

US 2002/0041483 A1 Apr. 11, 2002

(30) Foreign Application Priority Data

Sep. 13, 2000 (JP) .......................... 2000-277817

(51) Int. Cl.⁷ .............................. G06F 1/16; H05K 5/00
(52) U.S. Cl. .................. 361/683; 361/685; 710/14; 362/253
(58) Field of Search ................. 361/683, 684, 361/685, 686; 362/253, 800, 555, 561; 312/223.1, 223.2; 710/14, 10, 18

(56) References Cited

U.S. PATENT DOCUMENTS

D318,046 S  *  7/1991  Ichikawa ................. D14/326
5,481,645 A  *  1/1996  Bertino et al. ............ 361/680
5,768,164 A  *  6/1998  Hollon, Jr. ................ 361/686
D408,798 S  *  4/1999  Lee et al. .................. D14/318
6,073,187 A  *  6/2000  Jacobs et al. ............. 361/683
6,359,994 B1 *  3/2002  Markow et al. ........... 361/683

FOREIGN PATENT DOCUMENTS

| EP | 419177 A2 * | 3/1991 | ............. G06F/1/16 |
| EP | 0 875 818 A2 | 11/1998 | |
| JP | 2002-91614 A * | 3/2002 | ............. G06F/1/16 |
| TW | 375301 | 11/1999 | |

* cited by examiner

Primary Examiner—Lisa Lea-Edmonds
(74) Attorney, Agent, or Firm—Finnegan, Henderson, Farabow, Garrett & Dunner, L.L.P.

(57) ABSTRACT

A portable electronic device comprises a main body comprising a keyboard provided on a surface thereof and incorporating a content recording section, a display comprising a display surface facing to the keyboard and rotatably mounted on the main body, and an operating button which controls reproduction of contents stored in the content recording section and is provided at a portion on the surface of the body which is not covered by the display even if the display is closed.

11 Claims, 3 Drawing Sheets

PORTABLE ELECTRONIC DEVICE

CROSS-REFERENCE TO RELATED APPLICATIONS

This application is based upon and claims the benefit of priority from the prior Japanese Patent Application No. 2000-277817, filed Sep. 13, 2000, the entire contents of which are incorporated herein by reference.

BACKGROUND OF THE INVENTION

1. Field of the Invention

The present invention relates to a portable electronic device. More particularly, the present invention relates to a mount structure of a reproduction control button in a notebook type personal computer having a multimedia reproduction function.

2. Description of the Related Art

In recent years, in a notebook type personal computer, there has been introduced a variety of multimedia functions including a function for reproducing a music, and then outputting a sound by a personal computer's speaker, and a function for reproducing a moving picture, and then displaying the picture on a display, for example.

In order to achieve these multimedia functions, a CD-ROM drive, DVD-ROM drive or the like is mounted on a personal computer. In the case of reproducing a music, a compact disk having music data stored therein is inserted into the CD drive, and a user can enjoy music reproduction by operating the personal computer's keyboard, mouse, dedicated reproduction control button, and the like. Similarly, in the case of reproducing a moving picture, in general, a DVD disk is inserted into the DVD drive, and the user can reproduce a moving picture by operating the personal computer's keyboard, mouse, dedicated reproduction control button, and the like.

In this way, although the user can enjoy reproduction of a music or moving picture on the personal computer, in the case of the notebook type personal computer, its display device is connected turnably to its main body, and such display device is closed or opened. A personal computer of such kind must be normally used while the display device is opened in order to expose the keyboard and display screen. However, the display screen is essentially unnecessary to reproduce a music.

In recent years, there has been disclosed in European Patent Publication EP 0 875 818 A3, for example, that music reproduction control can be carried out even while the display device is closed.

In this example, a slip shaped portion that is not covered even while a display housing is closed in a main body housing of a portable computer is provided at a front portion. At this front portion, a plurality of buttons and a speaker grill for music reproduction are provided. With such a configuration, a CD-ROM is inserted into a CD-ROM drive while the computer's cover is closed, and a music can be reproduced. In addition, the speaker grill is exposed even if the computer's cover is closed, thus preventing the mute of sounds generated from the speaker disposed under the speaker grill.

However, in the above described prior art, a slip shaped portion must be provided redundantly at the front portion of the main body housing. Thus, there has been a problem that downsizing is impossible, which is indispensable in a portable computer requiring space reduction.

Currently, as a music or moving picture storage medium, in addition to a disk medium such as CD-ROM or DVD-ROM, there is introduced a communication medium distributed via Internet or the like. This communication medium is obtained by the user after downloaded over Internet through a network. Unlike such CD-ROM or DVD and the like, the communication medium is compressed by the computer's hard disk device, a memory card, or the like (for example, in a MP3 scheme). Therefore, it has been necessary to select a reproduction application because applications are different from each other for media.

Conventionally, a control button is not provided so as to correspond to a variety of these music media. Therefore, in the case of reproducing a music medium other than CD-ROM, the corresponding music reproduction application software is initiated by means of the keyboard or mouse while the display is opened, and music reproduction control must be conducted while the user keeps watching the display screen, which has been a very complicated operation for the user.

BRIEF SUMMARY OF THE INVENTION

It is an object of the present invention to provide a portable electronic device configured so that a display portion is rotatably provided as in a notebook type personal computer, in which, even if the display portion is closed, a button capable of controlling music reproduction can be mounted in a small space.

It is another object of the present invention to provide a portable electronic device corresponding to a variety of music media with their different recording systems.

According to one aspect of the present invention, a portable electronic device comprises a main body comprising an input section provided on a surface thereof and incorporating a content recording section; a display section comprising a display surface facing to the information input section and rotatably mounted on the main body; and an operating button configured to control reproduction of contents stored in the content recording section and provided at a portion on the surface of the main body which is not covered by the display section even if the display section is closed.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

Figure 1:
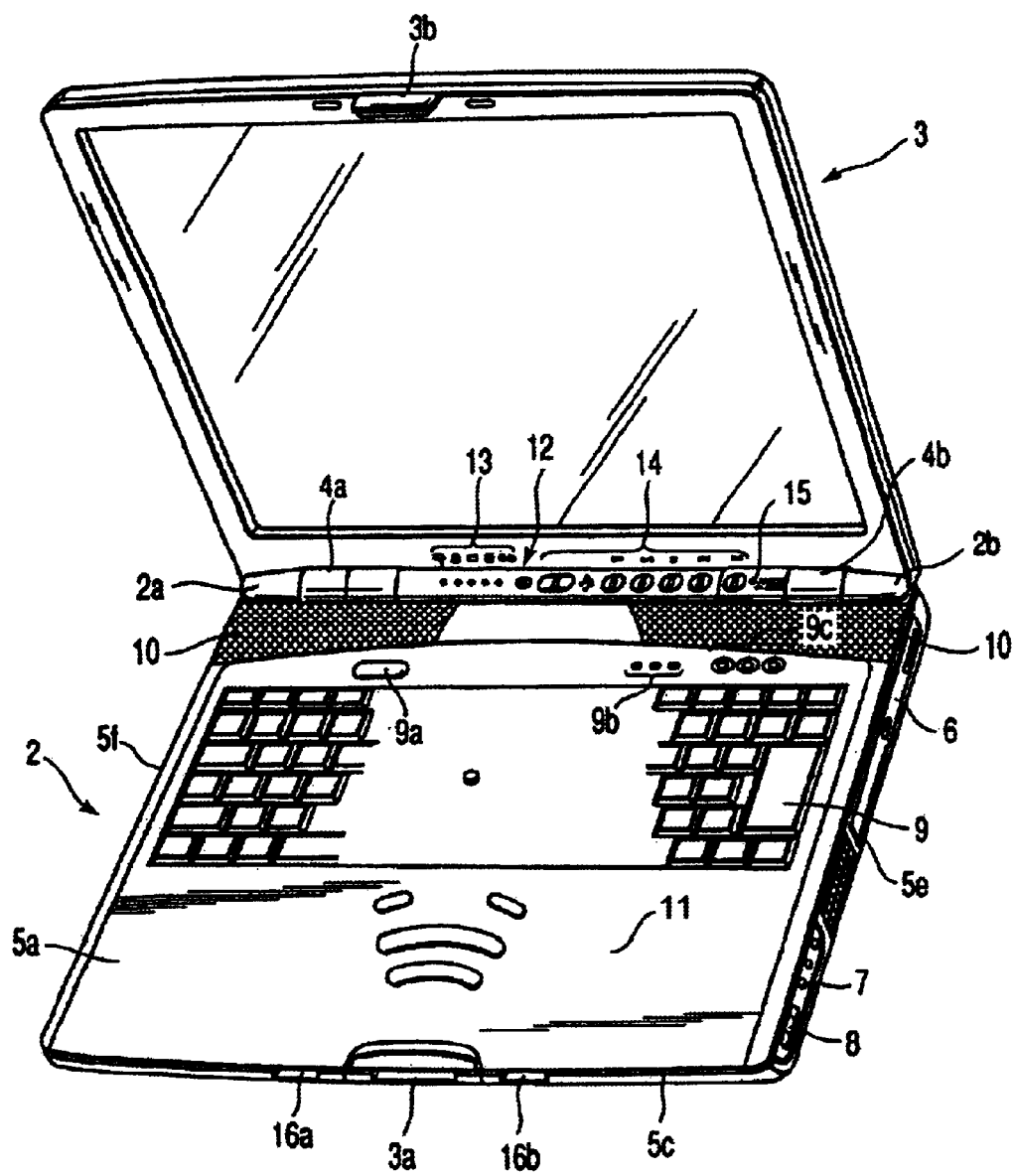
FIG. 1 is a perspective view of a notebook type personal computer as a portable electronic device according to a first embodiment of the present invention.
Figure 2:
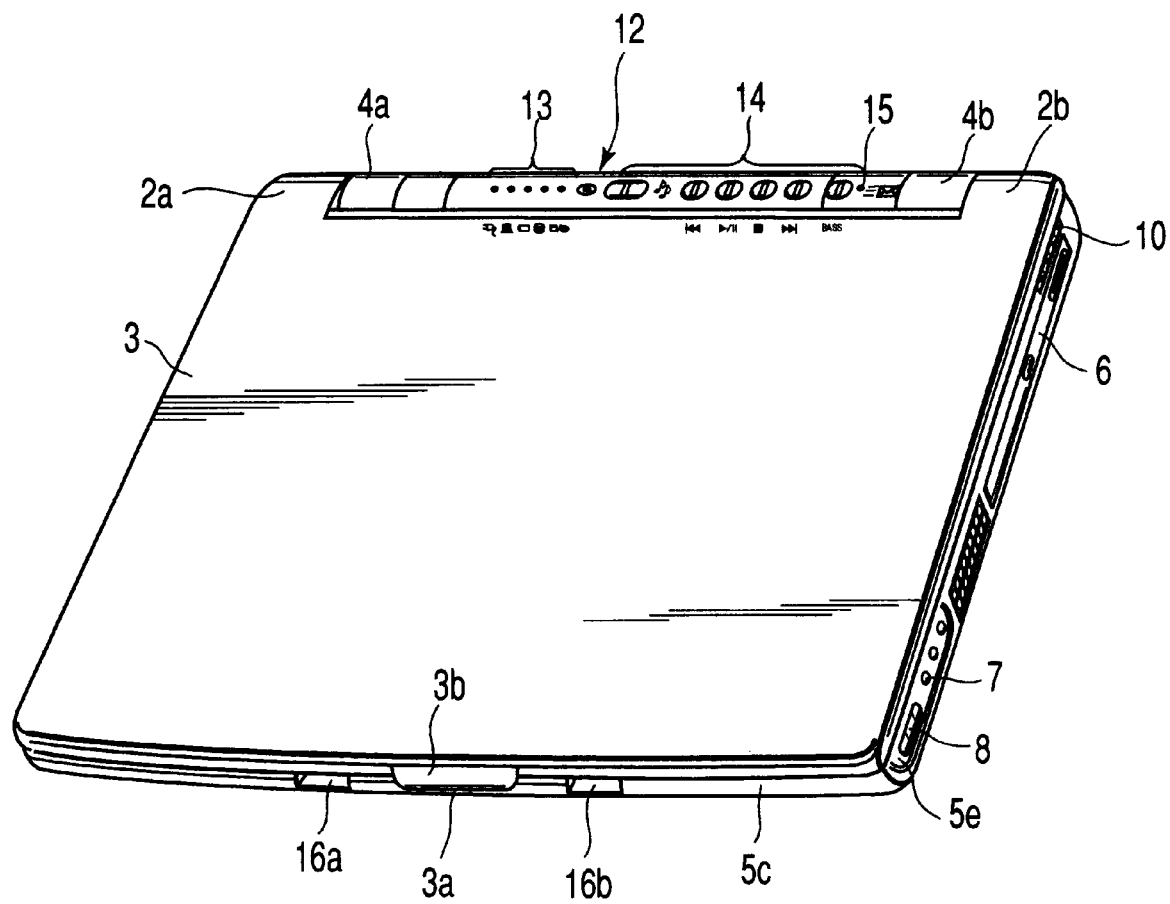
FIG. 2 is a plan view when a display portion of the personal computer shown in FIG. 1 is closed.

An embodiment of a portable electronic device according to the present invention will now be described with reference to the accompanying drawings. FIG. 1 shows an A4 size notebook type personal computer according to the first embodiment. FIG. 1 is a perspective view when a display is opened. FIG. 2 is a perspective view when the display is closed.

This personal computer comprises a main body 2 as a base unit and a display unit 3 turnably supported on the main body 2. The display screen of the display unit 3 faces to a keyboard 9 provided in the upper surface of the main body 2.

The main body 2 comprises a main frame formed in a flat, substantially rectangular box shape. This main frame has a top face 5a facing to the display, a bottom face, a front face 5c communicating with the top face 5a and the bottom face, a rear face, and left and right side faces 5e.

The main frame is made of a synthetic resin material such as ABS resin. A latch mechanism 3a is provided at the main body front face 5c. If the display unit 3 is closed, a latch 3b at the display unit side is latched, whereby the display unit 3 is fixed while it is closed. If the display unit 3 is opened, the display unit 3 can be opened by lifting it upwardly while the latch mechanism 3a is pressed.

In addition, bass boost speakers 16a and 16b are provided at both sides of the latch mechanism 3a of the main body front face 5c. The bass boost speakers 16a and 16b are additionally provided other than a pair of speakers 10 described later, and are specific speakers for emphasizing a bass sound. It is possible to switch whether or not a sound is outputted from the speakers 16a and 16b by user operation, as described later.

A disk drive unit 6 compatible with DVD-ROM and CD-R/RW is housed in a right side face 5e of the main body, and an earphone jack 7, a volume control knob 8 and the like are arranged.

A pair of speakers 10 are disposed horizontally equally at the top portion of the keyboard 9 on the top face 5a of the main body. The left and right ends of each of the speakers 10 reach the left and right side faces 5e. Even if the display unit 3 is closed, a sound leaks from the speakers 10. If an earphone is mounted on the earphone jack 7, of course, no sound leaks from the speakers 10.

An arm rest portion 11 is provided at a front end of the keyboard 9. At the upward portion of the keyboard 9, there are arranged a power switch button 9a, an LED 9b indicating a key state, and function keys 9c having a specific function such as Internet connection or E-mail transmission/reception.

At the immediate rear of the speakers 10, i.e., at the distal end of the main body top face 5a, a protrusion portion 12 is formed. The protrusion portion 12 is protruded upwardly from the top face 5a of the main body 2, and extends in the transverse direction of the main body 2. The protrusion portion 12 is formed in a cylindrical shape, and is disposed in the vicinity of a cross point between the top face 5a and rear face of the main frame.

The protrusion portion 12 has a pair of display support portions 4a and 4b. These display support portions 4a and 4b are disposed to be spaced in the transverse direction of the protrusion portion 12. At both ends thereof, leg portions 2a and 2b of the display unit 2 are disposed, and the leg portions 2a and 2b and the support portions 4a and 4b are rotatably coupled with each other via a hinge mechanism.

An LED group 13 for displaying various status of the personal computer, a content reproduction control button group 14, and an E-mail transmission/reception LED 15 are disposed at the protrusion portion 12 positioned between the display support portions 4a and 4b. In this way, the protrusion portion 12 is disposed between the leg portions 2a and 2b of the display unit 3, as shown in FIG. 1. Thus, if the display unit 2 is opened as shown in FIG. 1, the protrusion portion 12 is exposed at the rear of the speakers 10. As shown in FIG. 2, even if the display unit 2 is closed, the protrusion portion is exposed between the leg portions 2a and 2b of the display portion 2.

Now, a detailed configuration and operation of the status display LED group 13, content reproduction control button group 14, and E-mail transmission/reception LED 15 will be described with reference to FIG. 3.

Figure 3:
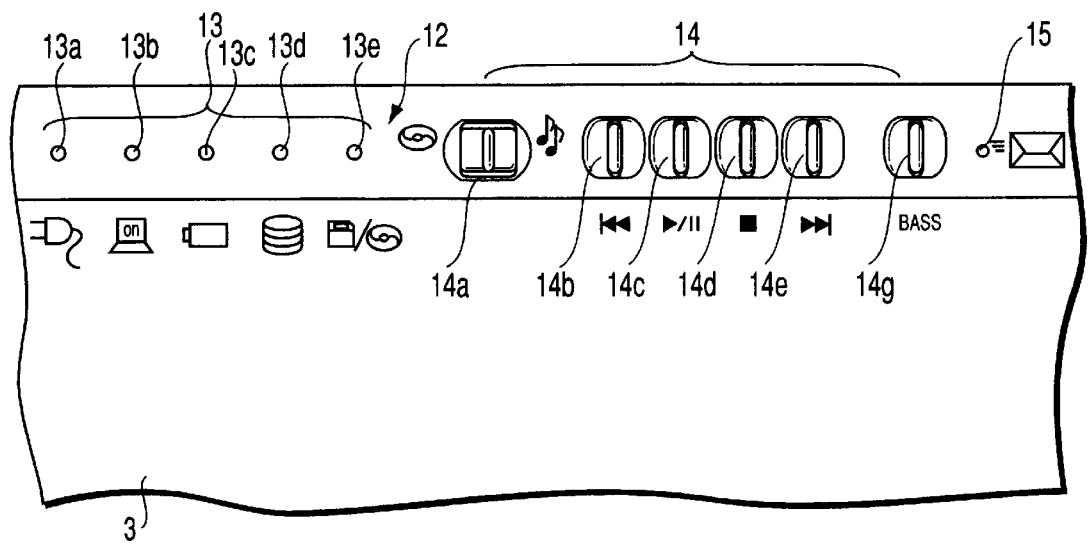
FIG. 3 is an enlarged view showing sound reproduction operating buttons or their periphery shown in FIGS. 1 and 2.
Figure 4:
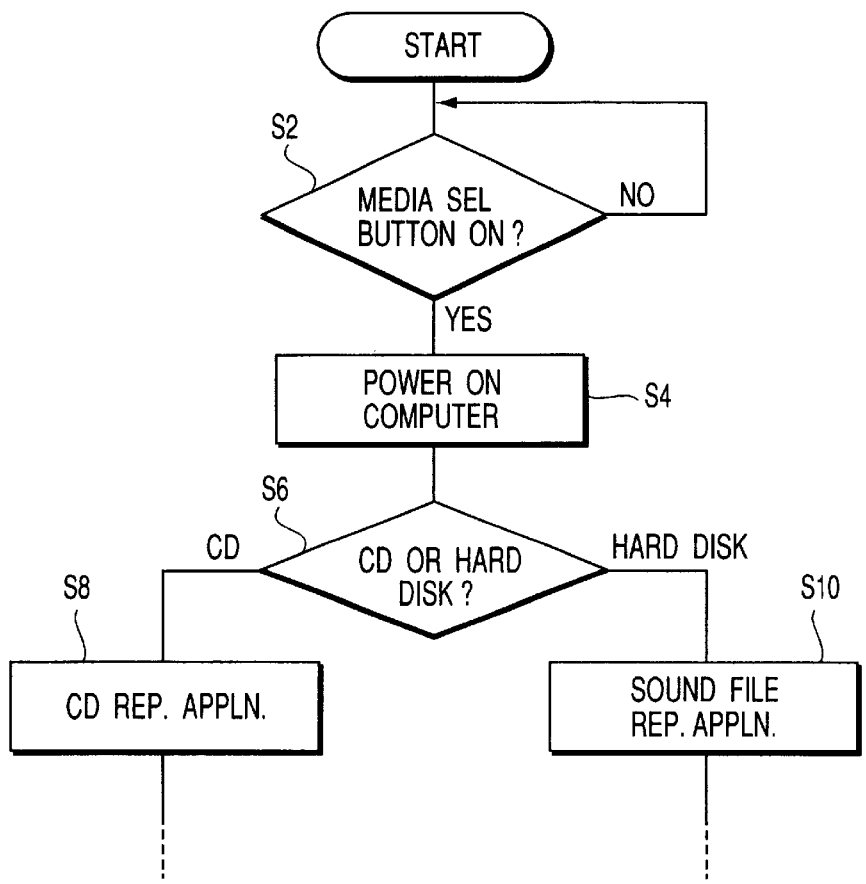
FIG. 4 is a flow chart illustrating an operation of the present embodiment.

FIG. 3 is an enlarged view of the protrusion portion 12 when the display panel 3 is closed.

As shown in FIG. 3, a variety of status display LEDs 13 are provided at the left side of the protrusion portion 12. These LEDs light, go out, or blink according to the operation state of the personal computer.

LED 13a denotes a power on/off status and lights when the power is turned on. LED 13b indicates whether or not external display is connected and lights if an external display such as ORT display is connected to this personal computer. LED 13c denotes a battery status or a charge state of a battery mounted on this personal computer, i.e., whether the battery is not changed or is in charge. LED 13d denotes an access status of a hard disk unit and lights when access to the hard disk unit is conducted. LED 13e denotes an access to a disk medium such as floppy disk, CD-ROM or DVD-ROM.

The content reproduction control buttons 14 are arranged adjacent to these status display LEDs 13. The user properly operates these buttons, whereby the user can reproduce and control music data stored in a disk medium or a hard disk unit having stored therein music contents set in this personal computer. Hereinafter, functions of these buttons will be described in detail.

Reference numeral 14a denotes a medium switch button, where the button is configured to be horizontally movable and return to the center after the movement. In the present embodiment, music contents are stored in a hard disk unit or a CD-ROM set in the disk drive 6. Even if the music contents are identical to each other, the data stored in both of these media are different from each other in data format (for example, compression system). Thus, the respective reproduction applications are required. If the music medium switch button 14a is moved to the left side, a disk medium, or specifically a compact disk set in the disk drive 6 or the application software for reproducing the CD disk is initiated. On the other hand, if the music medium switch button 14a is moved to the right side, the application software for reproducing music data stored in a hard disk unit (not shown), or specifically music data compressed in a scheme such as MP3 (MPEG LAYER 3) is initiated. When a storage medium of desired music contents is selected by operation of this music medium switch button 14a, thereby initiating the reproduction application suitable to the recording system of the storage medium, music reproduction is enabled.

Music reproduction control is effected by a variety of control buttons 14 listed below. That is, the music medium switch button 14a is a bottom for initiating the application software that corresponds to each recording system in order to reproduce music media with their different recording systems such as DVD-ROM or MP3 data. Even when the computer main body is powered off, operation of the music medium switch button 14a is valid. That is, as shown in FIG.

4, it is always determined whether or not the music medium switch button 14a is operated at step S2. When this operation is detected, a computer is powered on at step S4, and it is determined which of the media has been selected at step S6. If the computer has already been powered on, step S4 is skipped. If CD has been selected, a CD reproduction application is initiated at step S8. If a hand disk has been initiated, an application for reproducing a music file in the hard disk is initiated at step S10.

Reference numeral 14b denotes a reverse skip button that returns the current music to the immediately preceding piece of music. Reference numeral 14c denotes a play/pause button that reproduces/pauses a music. Reference numeral 14d denotes a stop button that stops the reproduction of the music. Reference numeral 14e denotes a forward skip button that forwards the current music to the immediately succeeding piece of music. After the application has been initiated, the first music may be automatically reproduced or may be standby until the play/pause button 14c has been pressed.

Reference 14g denotes a bass boost button that validates dedicated speakers 16a and 16b for emphasizing a bass sound. If this bass boost button 14g is pressed, an acoustic sound having a low tone component emphasized can be outputted from the bass boost speakers 16a and 16b.

The buttons 14b, 14c, 14d, 14e, and 14g are push buttons that are valid when they are pressed.

The functions of the content reproduction control buttons 14 other than the medium switch button 14a are described as characters or symbols at the back side of the display unit 3 as shown in FIGS. 2 and 3. They are also described as characters or symbols at bottom end of the front side of the display unit 3 as shown in FIG. 1. In this manner, the user can recognize the function of the content reproduction control buttons 14 irrespective of whether the display unit 3 is opened or closed. Moreover, if characters or symbols are described to be protrusive, the protrusion portion is large sized. However, characters or symbols are not described at the protrusion portion 12 in the present embodiment, and thus, the protrusion portion is not large sized. The medium changeover switch 14a is a horizontal slide switch, and describes a function at the protrusion portion 12. As long as this switch is provided as two push button switches, the function may be described on the surface of the display unit 3 similarly.

As has been described above, according to the present embodiment, the content reproduction control buttons 14 are disposed at the protrusion portion 12 provided between the display support portions 4a and 4b at the rear face of the main frame. Thus, as shown in FIGS. 1 and 2, the user can make operation irrespective of whether the display unit 3 is closed or opened. In addition, the hinge mechanism is provided at the protrusion portion 12. Thus, there is no need to provide a redundant slip shaped portion at the front face of the main body in order to make the content reproduction control buttons 14 operable even while the display unit is closed. Thus, in a portable computer requiring space reduction, the conventional problem with impossible downsizing is solved.

In addition, a recording medium of desired contents is selected by means of the medium switch button 14a, and the reproduction application according to the thus selected medium is automatically initiated. Thus, in addition to disk recording medium such as compact disk or DVD, a music medium such as MP3 downloaded from Internet and stored in the hard disk unit that becomes popular in recent years can be easily reproduced.

Further, the button 14g for selecting enable/disable of the bass boost speaker 16 is provided, whereby the user can switch a desired sound quality easily, and can enjoy music information even by a personal computer.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, a music content recording medium may be a memory card (mounted on a card slot (not shown)) other than CD or hand disk. In this case, a three-position medium changeover switch may be provided. The hard disk and memory card are provided in accordance with the same data format, and may be reproduced by the same reproduction application.

In addition, the contents used here are not limited to music contents. If a DVD is set in the disk drive 6, when a disk medium is selected, only the sound of the video contents is outputted from the speakers 10.

Further, if the protrusion portion 12 has a sufficient space, an elongated liquid crystal display portion is provided, and the title of contents in reproduction or an application name in initiation and the like may be displayed.

Although this embodiment has described as a personal computer, the present invention is applicable to a portable CD/DVD player having a function of reproducing a memory card storing a music data file of MP3 type.

What is claimed is:

1. A portable electronic device comprising:
    a main body comprising an input section provided on a surface thereof and incorporating a content recording section;
    a display section comprising a display surface facing to said input section and rotatably mounted on said main body; and
    an operating button configured to control reproduction of contents stored in said content recording section and provided at a portion on the surface of said main body which is not covered by said display section even if said display section is closed;
    wherein said operating button comprises a medium switch button configured to specify a content recording medium, and said main body further comprises a reproduction section configured to initiate a reproduction software that corresponds to a recording system of a medium specified by the medium switch button.

2. The portable electronic device according to claim 1, in which said content recording section comprises one of removable optical disk medium, a hard disk unit, and a removable memory card.

3. The portable electronic device according to claim 2, in which said medium switch button is configured to trigger initiation of the reproduction software.

4. The portable electric device according to claim 2, further comprising a speaker configured to output of a predetermined sound component, and in which said operating button comprises a sound output switch button configured to enable or disable a sound output from said speaker.

5. The portable electronic device according to claim 2, in which a character or symbol indicating a function for said operating button is described on a portion of the display surface of the display section that is adjacent to said operating button.

6. The portable electronic device according to claim 2, in which a character or symbol indicating a function for said operating button is described on a portion of a back surface of the display section that is adjacent to said operating button.

7. The portable electronic device according to claim 2, in which said display section comprises at least two leg sections, a portion of a shaft of a hinge mechanism connecting said display section and said main body is incorporated in the leg sections, said main body comprises a protrusion portion that extends in a transverse direction at a distal end of the input section, another portion of the shaft of said hinge mechanism is incorporated in said protrusion portion, and said operating button is provided on a surface of said protrusion portion.

8. The portable electronic device according to claim 2, further comprising a speaker configured to output a sound, a part of which is provided so as to be exposed even if said display section is closed.

9. A personal computer comprising:

a first section including a keyboard;

a second section rotatably connected to the first section and including a display panel;

a reproducing section configured to reproduce a content stored in one of a hard disk and an optical disk;

a reproduction control button provided at a junction between said first section and said second section so that the button is operable irrespective of whether said first and second sections are opened or closed, the button being valid even if the computer is powered off; and a speaker provided between the keyboard and the junction such that a portion thereof is not covered by said second section even if said second section is closed;

wherein said reproduction control button comprises a medium switch button configured to select one of hard disk and the optical disk, a backward skip button, a stop button, a reproduction/pause button, and a forward skip button, and wherein the reproduction section is configured to initiate a reproduction software that corresponds to a medium selected by the medium switch button.

10. The personal computer according to claim 9, in which said first section comprises a protrusion portion that extends in a transverse direction at a distal end, a portion of a shaft of a hinge mechanism connecting said first section and said second section is incorporated in the protrusion portion, and said reproduction control button is provided on a surface of said protrusion portion, and said second section comprises at least two protrusion portions in which another portion of the shaft of said hinge mechanism is incorporated.

11. The personal computer according to claim 10, in which said protrusion portion is formed in a substantially cylindrical shape.

* * * * *